United States Patent [19]

Nishimura

[11] Patent Number: 4,948,098

[45] Date of Patent: Aug. 14, 1990

[54] CHAIN HOIST

[75] Inventor: Yosaku Nishimura, Osaka, Japan

[73] Assignee: Vital Kogyo Kabushiki Kaisha, Osaka, Japan

[21] Appl. No.: 476,617

[22] Filed: Feb. 7, 1990

[30] Foreign Application Priority Data

Dec. 14, 1987 [JP] Japan .................................. 62-190444

[51] Int. Cl.[5] ............................................. F16G 15/00
[52] U.S. Cl. ............................................ 254/372; 59/93
[58] Field of Search ............. 242/107.2; 254/DIG. 14, 254/376, 371, 372; 59/93

[56] References Cited

U.S. PATENT DOCUMENTS

| | | | |
|---|---|---|---|
| 62,401 | 2/1867 | Eades | 254/373 X |
| 938,359 | 10/1909 | Wedell | 242/107 |
| 2,656,150 | 10/1953 | Lock | 254/372 |
| 2,658,721 | 11/1953 | Coffing | 254/372 X |
| 3,139,268 | 6/1964 | Carroll | 254/372 X |
| 4,398,387 | 8/1983 | Bary | 254/371 |

FOREIGN PATENT DOCUMENTS

| | | | |
|---|---|---|---|
| 167715 | 5/1954 | Australia | 254/376 |
| 225629 | 9/1958 | Australia | 254/376 |

*Primary Examiner*—Katherine A. Matecki
*Attorney, Agent, or Firm*—Mason, Fenwick & Lawrence

[57] ABSTRACT

A lever-operated hoist chain equipped with a cargo chain slip-out preventive mechanism. A slip-out preventive member linked to the unloaded side end part of a link chain in a hoist chain is made of a metal block excelling in impact resistance, and has a width greater than the interval between both side plates of the main body frame. Therefore, whether the load applied on the cargo lifting hook is large or small, if the let-off of the link chain unexpectedly exceeds the limit and the free end part side is excessively drawn out to the load side having the hook, the slip-out preventive member abuts against the outer circumference of the both side plates of the main body frame, and securely blocks the slip-out of the link chain free end part, so that the safety of the work is guaranteed.

2 Claims, 4 Drawing Sheets

CHAIN HOIST

This application is a continuation of application Ser. No. 249,987, filed Sept. 27, 1988, now abandoned.

BACKGROUND OF THE INVENTION

1. Field of the Invention

This invention relates to a chain hoist, and more particularly to a lever-operated chain hoist equipped with a cargo chain slip-out preventive structure.

2. Description of the Prior Art

Conventionally a lever-operated chain hoist is generally used for handling relatively lightweight objects. In this kind of chain hoist, usually, the operation lever is manipulated manually, and the cargo chain wheel pivoted in the main body frame is rotated, and the link chain wound on this cargo chain wheel is wound up or let off, so that the object is lifted or lowered, or pulled in.

This link chain has a lifting hook provided at its one end, while a stopper ring is linked to the other end, that is, the free end part, as a slip-out preventive member of the link chain.

This stopper ring is intended to prevent the link chain from slipping out of the cargo chain wheel in the main body frame by exceeding the let-off limit, and it is formed in a circular ring shape of which outside diameter is greater than the width of the link of the link chain (for example, as disclosed in the Japanese Utility Model Publication No. 59-91292).

However, the chain hoist in such structure involves the following problems, and its need for improvement has been recognized.

That is, while the link chain is in unloaded state, or if the load applied on the link chain is much smaller than the load bearing capacity of the hoist itself, this stopper ring will not lose is slip-out preventive function.

But when a large load is applied to the link chain, if the free end part of the link chain is unexpectedly retracted in its lifting or lowering work, the stopper ring hits hard against the part in the hoist main body due to this pulling force, and it may be deformed.

As a result, the slip-out preventive function of the stopper ring is lost, and the subsequent chain hoist operation may be disturbed, or if the hook side load is extremely large, the stopper ring may be further deformed, and it may slip out to the load side of the hook from the cargo chain wheel, and such a slip-out event may lead to an unexpected accident in a worst case.

BRIEF SUMMARY OF THE INVENTION

This invention was devised in the light of the conventional problems, and it is hence a primary object of this invention to present a novel chain hoist solving the above-discussed problems.

It is another object of this invention to present a chain hoist capable of securely blocking the slip-out of the free end side part of the link chain from the cargo chain wheel, even if the let-off of the link chain by lever operation has exceeded the limit by mistake, by causing the slip-out preventive member linked to the free end part of the link chain to abut against the outer circumference of the both side plates of the main body frame.

It is a different object of this invention to present an extremely safe chain hoist free from deformation of the slip-out preventive member, or trouble or accident due to deformation of the slip-out preventive member, even if a large load is applied to the cargo lifting hook of the link chain.

It is a further different object of this invention to present a chain hoist, in which the slip-out preventive member serves also as a grip when pulling back the link chain, and the link chain may be pulled back easily by holding and pulling the slip-out preventive member.

The chain hoist of this invention is a lever-operated chain hoist, in which the cargo chain wheel pivoted in the main body frame is rotated by lever operation, and the link chain wound on the cargo chain wheel is wound up or let off accordingly. In this chain hoist, a slip-out preventive member is linked to the free end part of this link chain, and this slip-out preventive member is made of metal blocks excelling in impact resistance, having a width greater than the interval of the both side plates of the main body frame, and possessing a slot in which the link of the chain link can be inserted in its middle part and a bolt through-hole at its side, and the top end link of the unloaded side end part of the link chain is inserted into this slot of the slip-out preventive member, and a bolt is inserted into this inserted link from the side of the slip-out preventive member, while a slip-out preventive block is linked to the free end part of the link chain, and when this link chain is pulled out to the load side, the slip-out preventive member abuts against the outer circumference of the both side plates of the hoist main body frame, thereby securely preventing the free end part of the link chain from slipping out.

The shape of this slip-out preventive member is not particularly limited, but preferably it should be formed in a shape that can be easily held by the operator, and it is further preferable to dispose a projection in the lower part so that the hand gripping the slip-out preventive member may not slide when pulling back by holding the free end of the link chain. The metal block to compose the slip-out preventive member may be preferably made of casting excelling in impact resistance.

These and other objects of this invention as well as the features thereof will be more clearly understood and appreciated by the detailed description and novel facts disclosed in the claims taken in conjunction with the drawings.

DETAILED DESCRIPTION OF THE PREFERRED EMBODIMENT

Figure 1:
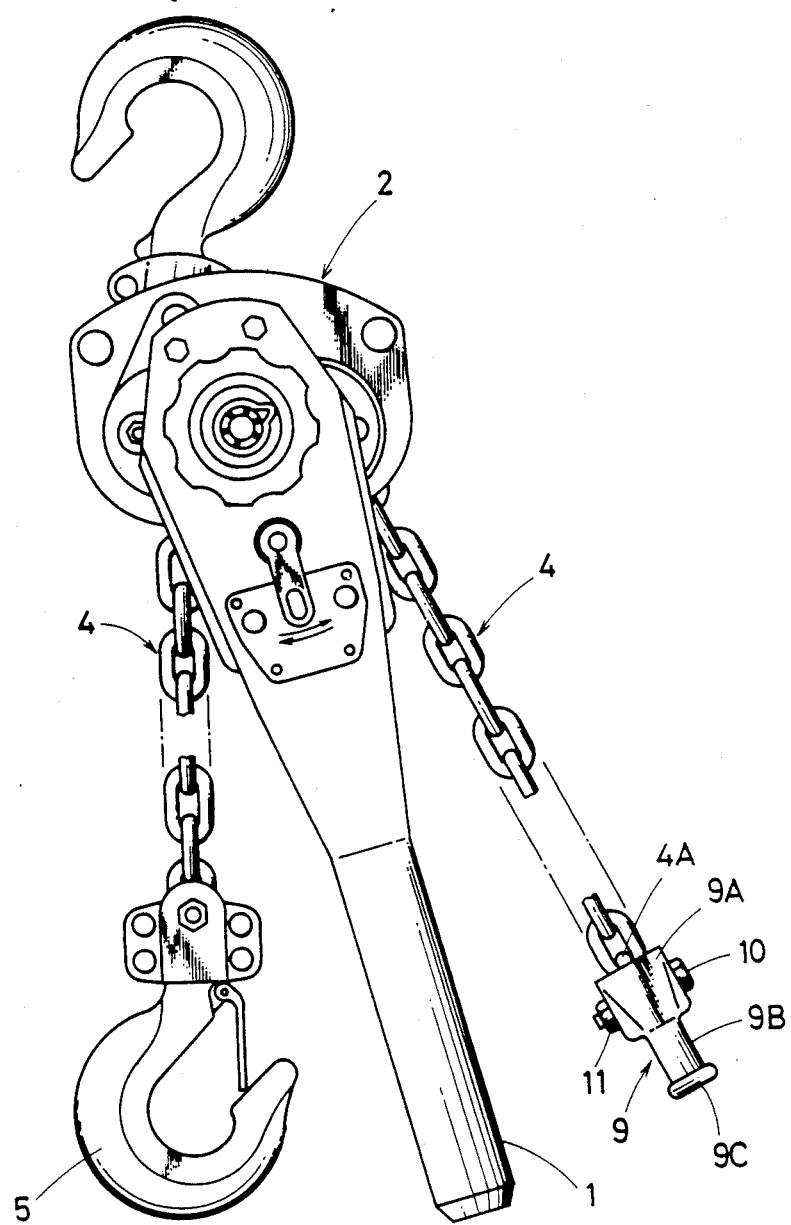
FIG. 1 is a side elevation drawing showing a lever-operated chain hoist as one of the embodiments of this invention.

Referring now to the drawings, a preferred embodiment of this invention is described in details below.

Figure 3:
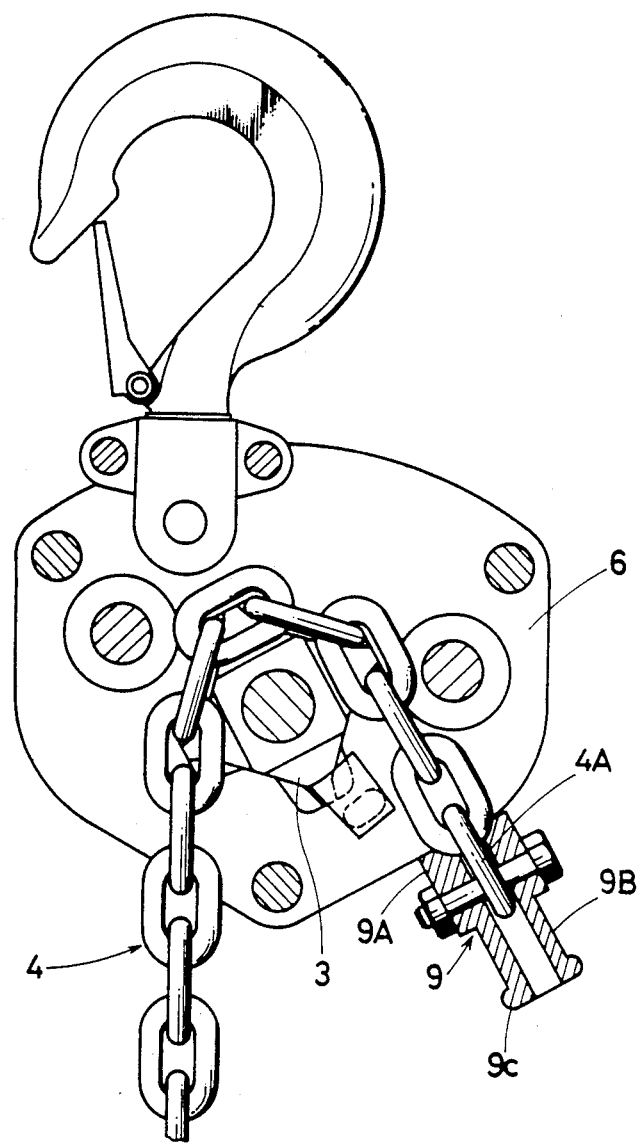
FIG. 3 and FIG. 4 are longitudinal sectional view and partially cut-away front view showing the abutting state of the main body plate and metal block for slip-out preventive member of the same chain hoist.

A lever-operated chain hoist according to this invention is shown in FIG. 1 and FIG. 3, and this chain hoist is constituted as follows: a lever 1 is manipulated, and a cargo chain wheel 3 pivoted in a main body frame 2 is rotated through a drive transmission mechanism (not shown), and a link chain 4 which is a cargo chain wound on the cargo chain wheel 3 is wound up or let off.

The link chain 4 has a cargo lifting hook 5 linked at its one end, while a metal block 9 is linked as a slip-out preventive member to the other end, that is, to a link 4A which is free, unloaded end.

Figure 2:
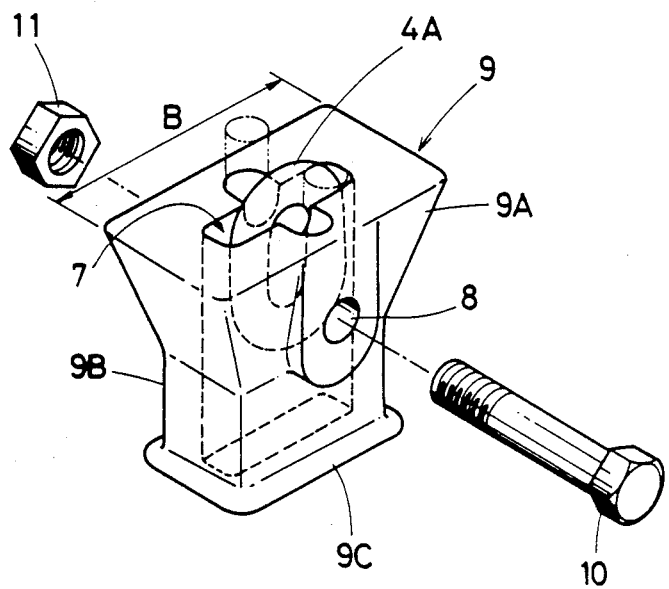
FIG. 2. is a perspective exploded view showing the metal block for slip-out preventive member of the same chain hoist.
Figure 4:
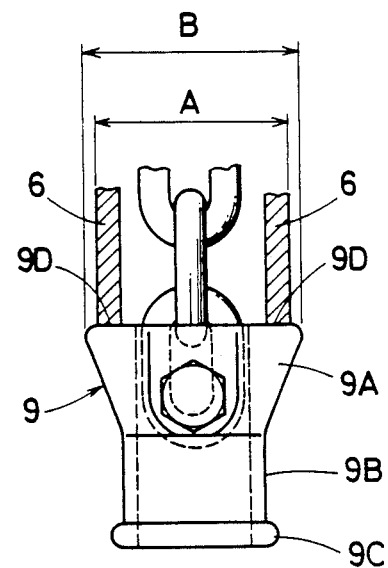

The metal block 9 is a casting excelling in impact resistance formed in a shape as shown in FIG. 2 and FIG. 4, and it is made of a metal of which strength is similar to or greater than that of the cargo lifting hook 5.

The width B of the metal block 9 is set greater than the interval A of both side plates 6, 6 of the main body frame 2, and a slot 7 for inserting the link 4A of the link chain 4 is provided in the middle part of the metal block 9, while an insertion 8 of a bolt 10 is disposed at its side, penetrating through this slot 7.

The link 4A at the unloaded end side end part of the link chain 4 is inserted into the slot 7 in the metal block 9, and the bolt 10 is inserted into the other side from one side of the metal block 9 through the insertion hole 8 and link 4A, and the end of the bolt 10 is fixed by a nut 11, so that the metal block 9 is linked to the free end of the link chain 4.

Meanwhile, the metal block 9 is formed in a grip shape, comprising a trapezoidal linkage part 9A in which the bolt 10 is inserted, a rectangular grip part 9B smaller than the linkage part 9A, and a stopping projection 9C provided in the lower edge of the grip part 9B. As a result, the link chain 4 can be pulled back easily while the hook 5 side is unloaded.

In thus composed chain hoist, by manually manipulating the lever 1, the cargo chain wheel 3 pivoted in the main body frame 2 is rotated, and the link chain wound on the cargo chain wheel 3 is wound up or let off.

At this time, if the let-off of the link chain by operation of the lever 1 has exceeded the limit by mistake, the unloaded side part of the link chain 4 may be excessively pulled out to the cargo lifting hook 5 side. In such a case, the upper side parts 9D, 9D of the metal block 9 abut against the outer circumference of the both side plates 6, 6 of the main body frame 2 as shown in FIG. 4, so that the free end part of the link chain 4 is prevented from slipping out of the cargo chain wheel 3.

What is more, if a large load is applied to the cargo lifting hook 5, the metal block 9 will not be deformed, as experienced conventionally, because it excels in impact resistance, so that troubles and accidents due to deformation of the slip-out preventive member will not occur, which guarantees utmost safety.

Furthermore, this metal block 9 serves as a grip when pulling back the link chain 4, and by holding and pulling the metal block 9, the link chain 4 may be easily pulled back, and many other practical and beneficial effects are brought about.

Thus, according to this invention, various effects, among others, are obtained as given below.

Since the slip-out preventive member is linked to the unloaded side end part of the link chain, if the let-off of the link chain by lever operation has exceeded the limit by mistake, the slip-out preventive member abuts against the outer circumference of the both side plates of the main body, thereby securely preventing the free end side part of the link chain from slipping out of the cargo chain wheel.

Moreover, since the slip-out preventive member is a metal block excelling in impact resistance, if a large load is applied to the cargo lifting hook of the link chain, this metal block will not be deformed as experienced previously, and the chain hoist is quite safe, free from troubles and accidents due to deformation of the slip-out preventive member.

Still more, the metal block for slip-out prevention serves also as a grip when pulling back the link chain, and the link chain may be pulled back easily by holding and pulling the metal block, and practically beneficial effects are exhibited.

Meanwhile, the embodiment mentioned in the detailed description of this invention is presented only for the purpose of disclosing the technical information of this invention, and this invention should not be interpreted in its narrow sense by limiting only to this embodiment, but should be executed in various forms within the true spirit and claims of this invention in a wider sense of interpretation.

What is claimed is:

1. A lever-operated chain hoist in which a cargo chain wheel is pivoted in a main body frame formed of a pair of side plates having a spacing between the side plates to receive the chain wheel therebetween, the chain wheel being rotated by a lever device and a link chain being wound on the cargo chain wheel to be wound up or let off and having a load end and a free end, comprising:

a slip-out preventing member linked to the free end portion of the link chain;
   the slip-out preventing chain member being a monoblock casting metal block excelling in impact resistance having an upper end face formed as a planiform surface of greater width than the spacing between said side plates forming the main body frame;
   the metal block having a slot opening through the middle portion of said upper end face for inserting an endmost link of the link chain therein;
   a stopping bolt;
   a bolt insertion hole extending through the metal block for inserting the stopping bolt therein;
   the slot receiving the endmost link at said free end of the link chain in inserted relation therein, and said stopping bolt being inserted into a side portion of said metal block through said insertion hole and through said endmost link to secure said free end of the link chain thereto;
   a nut for securing said bolt in said metal block; and
   the metal block having a middle portion defining a grip portion narrower transversely than said upper end face and a slide-preventive protrusion in a hoist portion thereof.

2. A chain hoist according to claim 1, wherein the metal block is made of a metal having a strength stronger than that of the cargo lifting hook of the link chain.

* * * * *